US006796679B2

(12) United States Patent
Smith, Jr. et al.

(10) Patent No.: US 6,796,679 B2
(45) Date of Patent: Sep. 28, 2004

(54) SNAP TOGETHER MOLDED REFLECTOR PIVOT ASSEMBLY

(75) Inventors: John L. Smith, Jr., Deputy, IN (US); Paul W. Krinop, Osgood, IN (US)

(73) Assignee: Valeo Sylvania L.L.C., Seymour, IN (US)

( * ) Notice: Subject to any disclaimer, the term of this patent is extended or adjusted under 35 U.S.C. 154(b) by 56 days.

(21) Appl. No.: 10/277,550

(22) Filed: Oct. 22, 2002

(65) Prior Publication Data

US 2004/0076005 A1 Apr. 22, 2004

(51) Int. Cl.$^7$ ............................................. F21V 14/04
(52) U.S. Cl. ...................... 362/239; 362/283; 362/516; 362/514
(58) Field of Search ................................ 362/239, 283, 362/475, 476, 516, 238, 549, 514, 517, 518, 543, 544, 304, 359, 296

(56) References Cited

U.S. PATENT DOCUMENTS 4,584,589 A * 4/1986 Bivins et al. ............... 343/882
4,722,033 A * 1/1988 VanDuyn et al. ........... 362/528

* cited by examiner

Primary Examiner—Thomas M. Sember
Assistant Examiner—Bao Q. Truong
(74) Attorney, Agent, or Firm—William E. Meyer

(57) ABSTRACT

A two-piece reflector has a base member with a substantially planar surface including a substantially complete reflector and a partially complete reflector projecting therefrom and integral therewith. First and second spaced apart supports are associated with the partially complete reflector and project from the base member and provide pivot points therein. A substantially concave housing is adjustably fitted to cooperate with the partially complete reflector. The concave housing has a pair of spaced apart, projecting, axially aligned nubbins, a first of these nubbins being rotationally fixed to the pivot point in the first support and a second of the nubbins being rotationally fixed to the pivot point in said second support. This allows rotational adjustment of the housing about the axis defined between the pivot points. Means are provided attached to the concave housing for fixing the same in a desired position.

9 Claims, 7 Drawing Sheets

SNAP TOGETHER MOLDED REFLECTOR PIVOT ASSEMBLY

TECHNICAL FIELD

This invention relates to reflectors and more particularly to reflectors for use with vehicle lamps. Still more particularly, it relates to reflectors wherein at least one of the reflectors is adjustable to direct the light therefrom in a particular direction.

BACKGROUND ART

Vehicles frequently include additional lamps to light the road under different conditions. Called auxiliary lamps, one usual operation is for fog lamps to be used under conditions of limited visibility. It is important for such lamps to be especially adjustable and the ease of such adjustability is equally important.

DISCLOSURE OF INVENTION

It is, therefore, an object of the invention to obviate the disadvantages of the prior art.

It is another object of the invention to enhance the manufacture of adjustable lamps.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
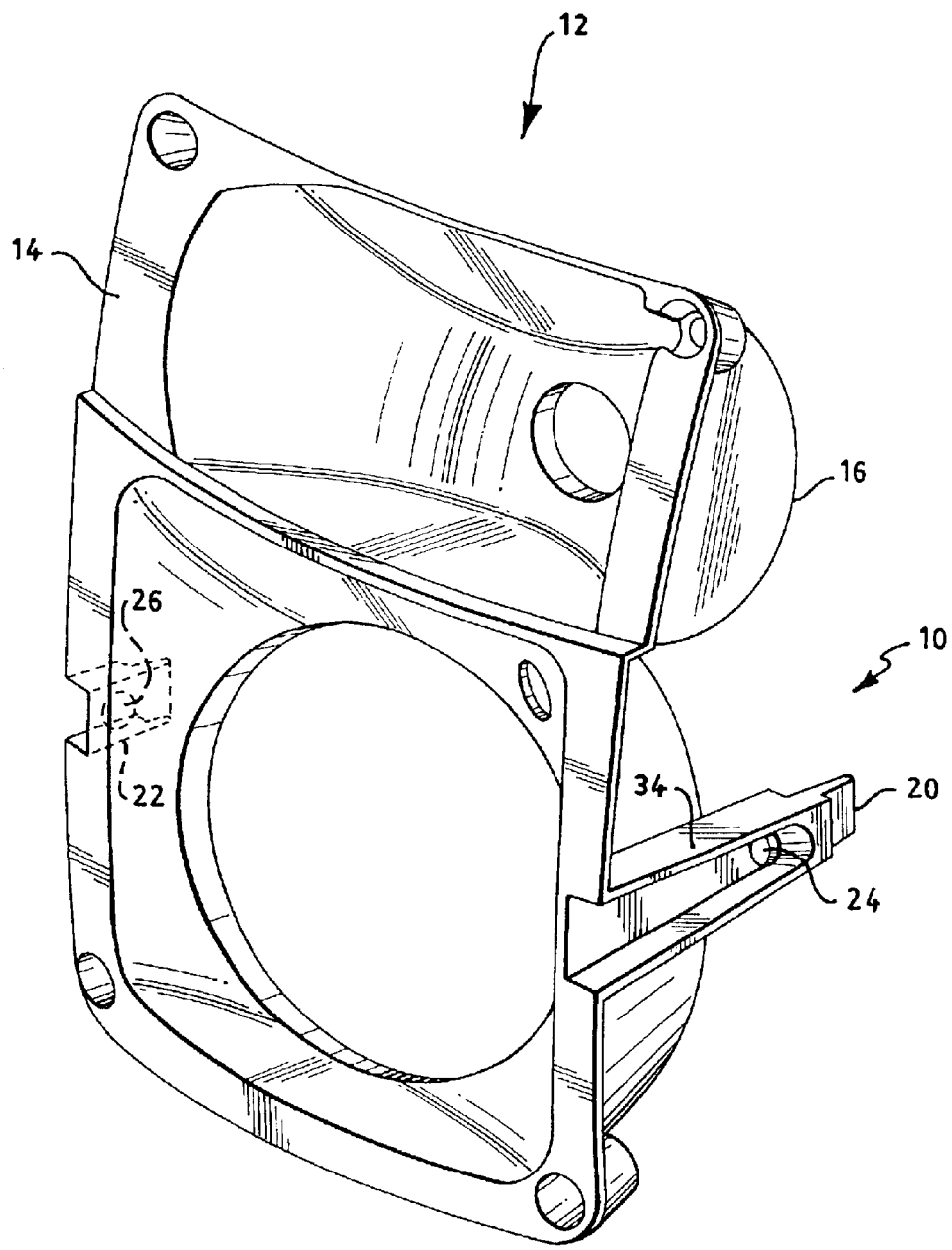
FIG. 1 is a partial, front perspective view of an embodiment of the reflector of the invention.
Figure 2:
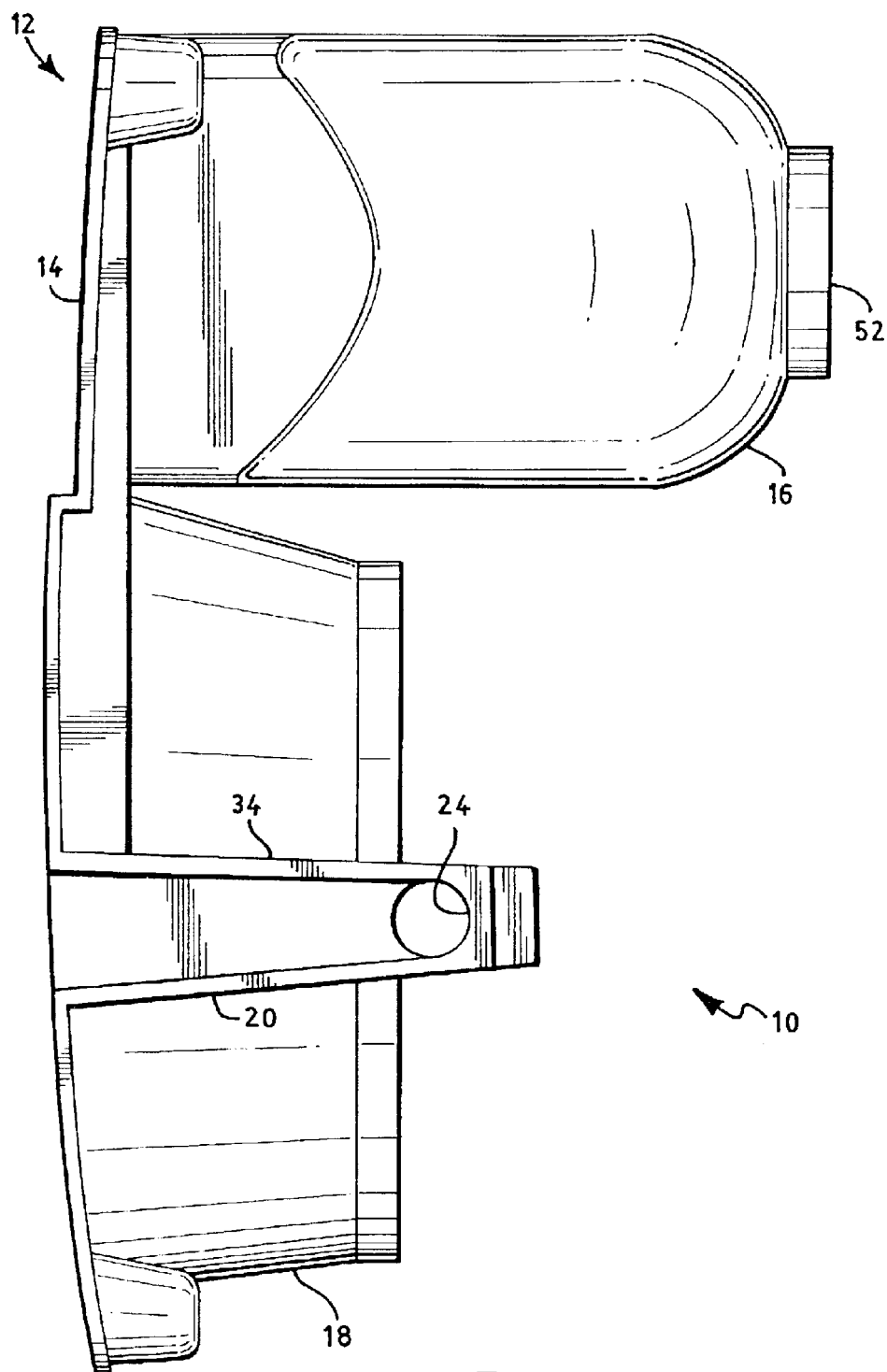
FIG. 2 is a side view of the same.
Figure 3:
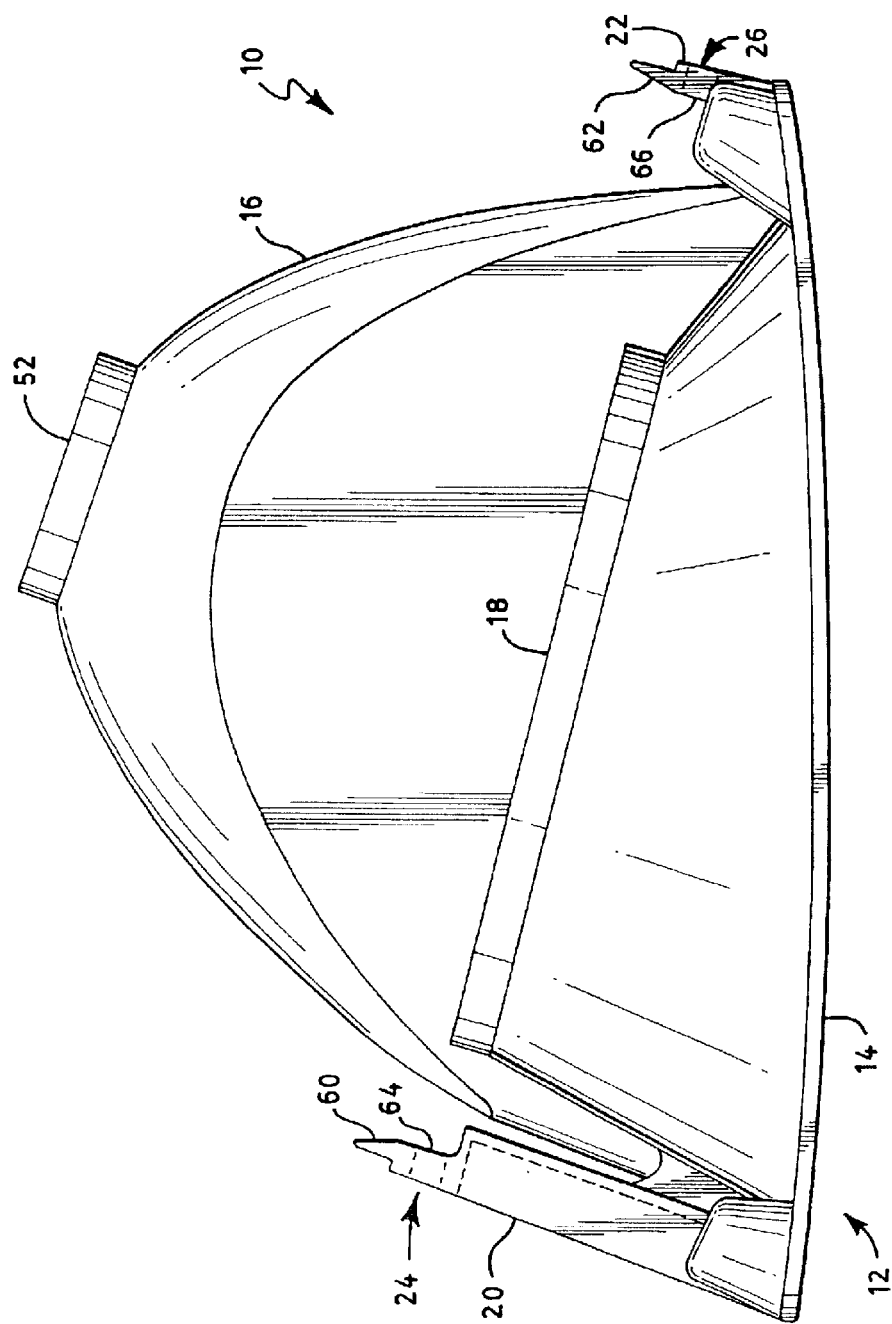
FIG. 3 is a bottom view of the same.
Figure 4:
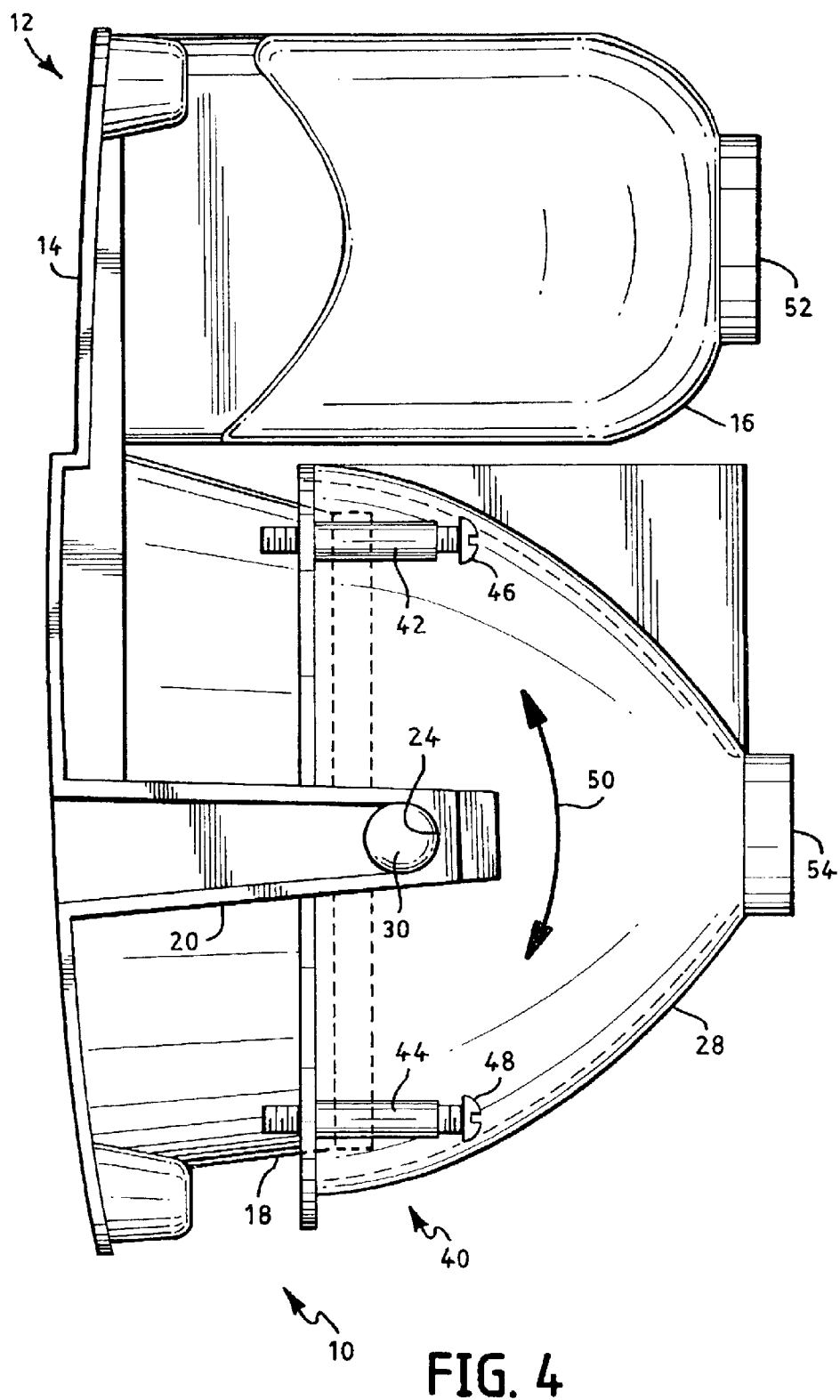
FIG. 4 is a side view of a reflector of the invention with an adjustable element in place.
Figure 5:
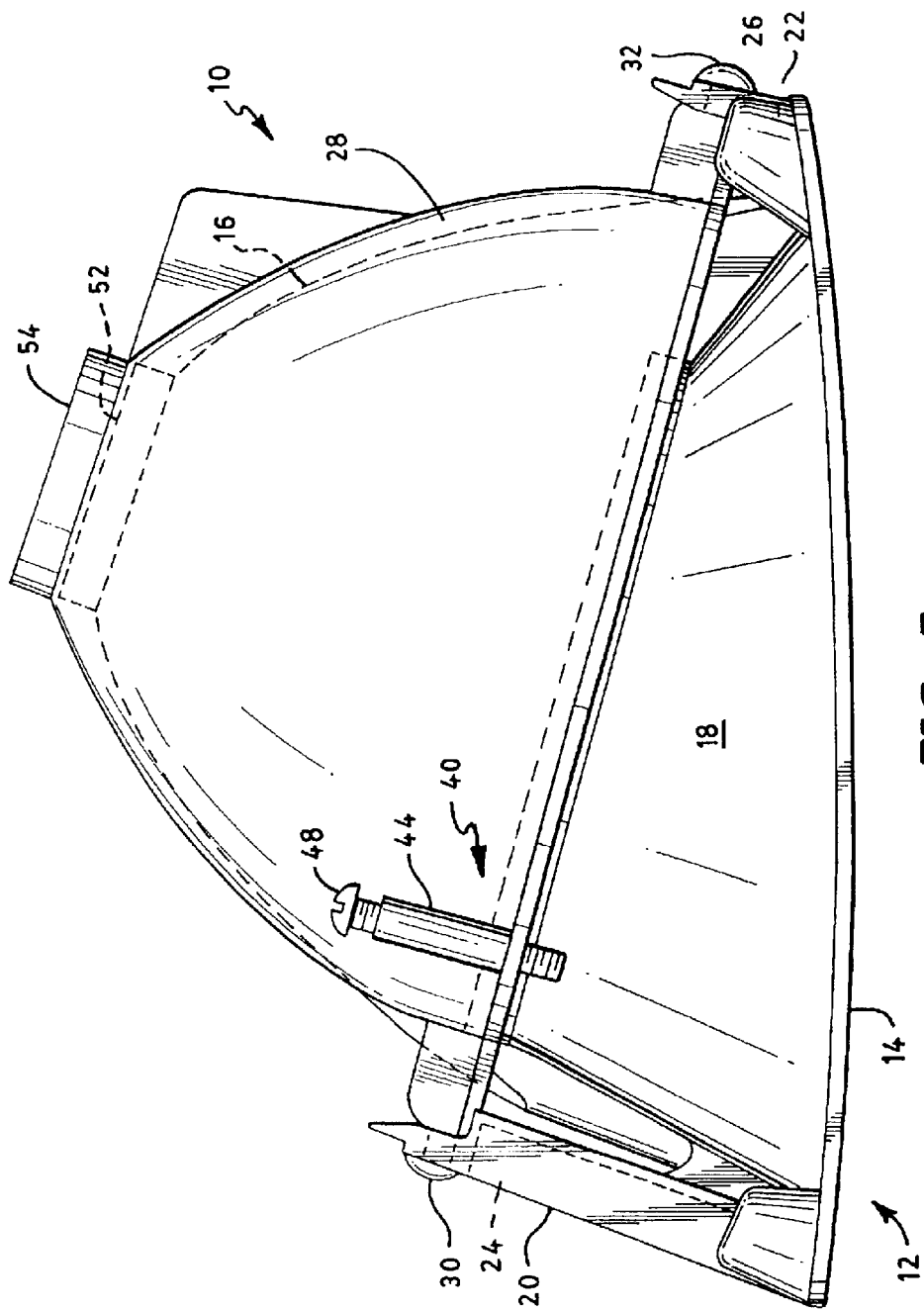
FIG. 5 is a bottom view of the reflector of FIG. 4.

Referring now to the drawings with greater particularity, there is shown in FIGS. 1, 2 and 3 a base member 12 for a two-piece reflector housing 10 formed from resin injected between two mold faces. The preferred base member 12 has a substantially planar front surface 14 having a substantially complete reflector 16 and a partially complete reflector 18 projecting therefrom. As used herein "substantially planar" includes surfaces that can have curvature necessary to mate with the contours of the vehicle with which it is employed. First and second spaced apart supports, for example arms 20 and 22 are associated with the partially complete reflector 18, with one of the arms, 20 in this instance, being longer than the other arm 22. The arms have pivot points 24, 26, respectively, in the form of circular apertures provided therein. The arms 20, 22 may be located at opposite edges of the partially complete reflector 18. Each arm 20, 22 extends away from the rear side of the partially complete reflector 18 and each is formed with a pivot hole 24, 26, and a ramp 60, 62. The pivot holes are defined by a scissoring action of the mold faces. One side of the mold extends to form half of a pivot hole. The second side of the mold forms the second half of the pivot hole. These pivot halves are axially adjacent, and when the mold halves close one to the other the mold faces pass one another in a scissoring action to form a passage extending between the two sides of the pivot hole. The each pivot coupling then has a first side defining a first surface of rotation about an axis, and a second side defining a second surface of rotation about the same axis. The second side is axially offset from the first side. The first side and second side then define an axial passage extending between the first side and the second side. The two resulting holes (passages) form pivots 24, 26 that are sized and shaped to receive the nubbins 30 and 32. The two pivot holes are also aligned to define a pivot axis. In the preferred embodiment, extending away from the pivots 24, and 26 towards the distal ends of the supports (arms 20, 22) are ramps 60, 62. Each ramp 60, 62 leads from an distal end of the respective arm 20, 22 to an edge of the pivot hole 24, 26. The ramps generally face one another along an axis parallel to but offset from the pivot axis. Each arm 20, 22 is slightly flexible, so the arms may be spread one from another in the axial direction, thereby increasing the distance between the openings to pivot holes 24, 26.

A substantially concave housing 28 is adjustably fitted to cooperate with the partially complete reflector 18. The concave housing 28 has a pair of spaced apart, projecting, axially aligned shafts or nubbins 30, 32. The nubbins 30, 32 have exterior diameters allowing snug axial rotation of the nubbins 30, 32 in the respective pivot holes 24, 26. A first of the nubbins, for example, 30, is rotationally fixed to pivot point 24 in the first arm 20 and the other of the nubbins, 32, is rotationally fixed to pivot point 26 in the second arm 22. This allows rotational adjustment of the position of the concave housing 28 to allow alignment of the light source, which will ultimately be placed inside the concave housing 28. The preferred concave housing 28 is further formed with blocking faces 64, 66 extending transversely to the nubbins 30, 32. Each blocking face 64, 66 abuts a corresponding face of a respective support, such as arms 20, 22, to block parallel axial shifting of the reflector relative to the partially complete reflector 18.

Figure 6:
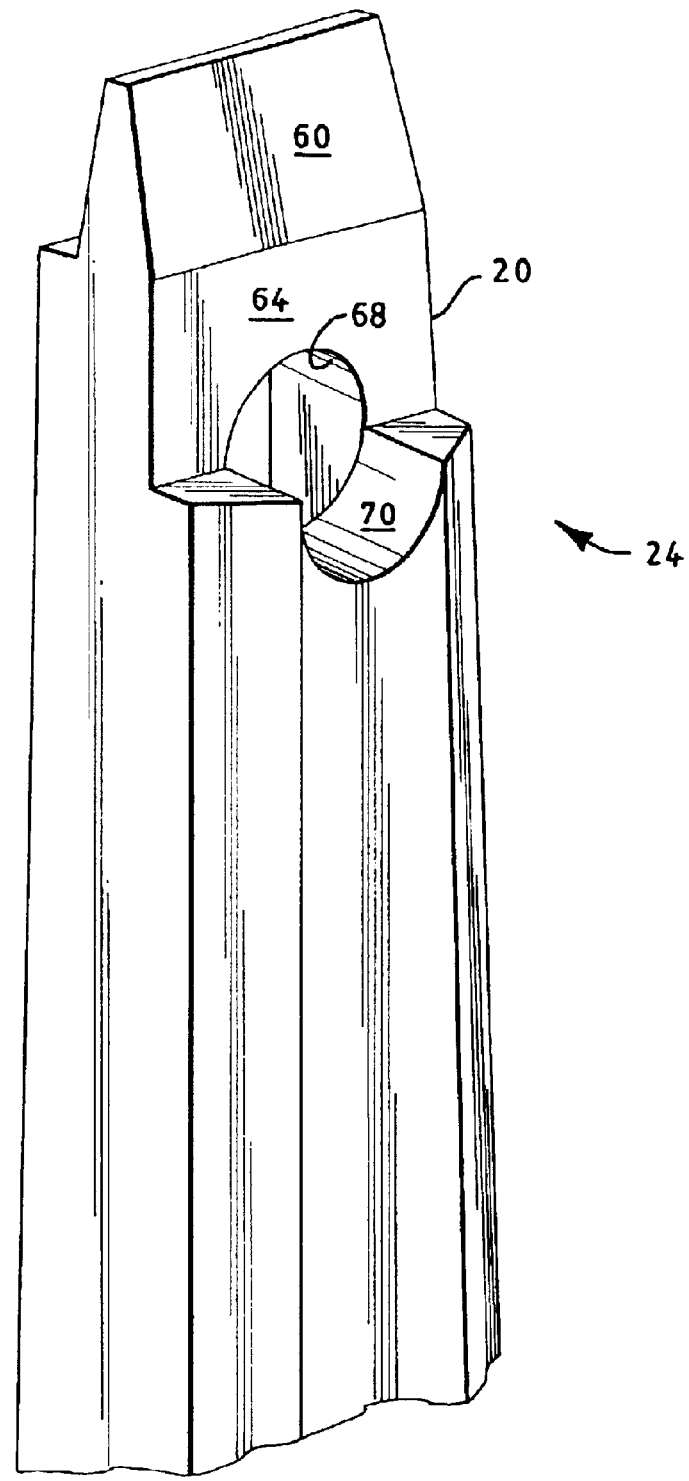
FIG. 6 is an inner view of an arm, partially broken away.
Figure 7:
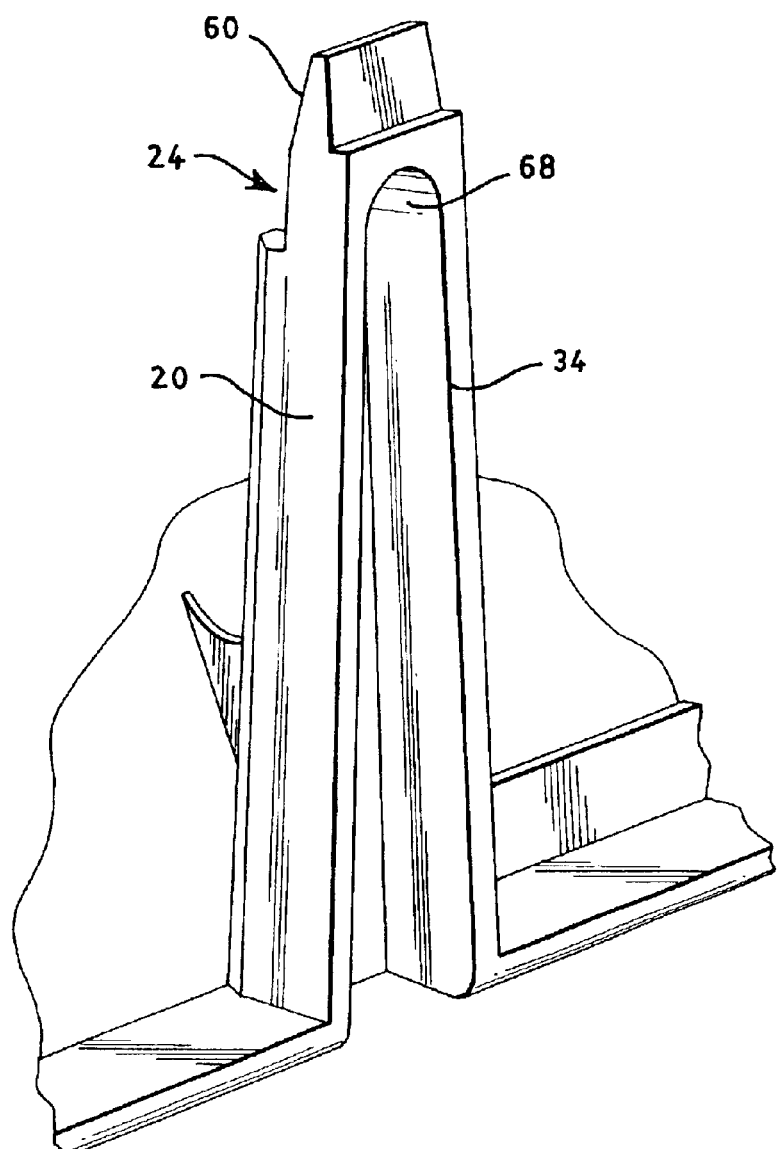
FIG. 7 is an outer view of an arm, partially broken away.

As shown in FIGS. 1, 2, 3 and 4, arm 20 is provided with upstanding walls 34 (face outwards) to strength the arm. FIG. 6 is an inner view of arm 20, partially broken away. The hole 24 is shown as formed by adjacent, semicircular arch sections 68 and 70. FIG. 7 is an outer view of arm 20, partially broken away. To affix the partially complete reflector 18 to the concave housing 28, the nubbin 32 is positioned in its pivot point 26 and the nubbin 30 is positioned at the base of ramp 60. Nubbin 30 is then pressed along ramp 60 causing the arm 20 to flex away from arm 22. Nubbin 30 then drops into pivot point 24, and arm 20 snaps closed, trapping nubbins 30 and 32 in pivots 24 and 26. The flexible supports of partially complete reflector 18 are then spread to an open position, with the nubbin 30 being guided along the support until the nubbin 30 is fixed in the pivot point 24, and the support snaps closed. The blocking faces 64, 66 then abut the arms 20, 22 to block parallel axial shifting of the concave housing 28. This abutment may be slightly tensed to prevent axial motion (rattle). The concave housing 28 is then pinned by the pivot holes 24, 26, but is free to rotate in the pivot holes 24, 26. It is however blocked from parallel axial motion by blocking faces 64, 66.

The concave housing 28 further includes fixing means 40 for stabilizing the position of the concave housing in a desired position by causing rotation about the axis existing between the pivot points 24, 26 locating the nubbins 30, 32. The rotation direction is indicated by arrow 50 in FIG. 4. The fixing means 40 can be any appropriate construction and is shown in the drawings as comprising threaded bosses 42, 44 fitted with threaded bolts 46, 48, the bolts contacting a convenient fixed surface such as a lens cover (not shown) or a rear housing (not shown). An adjuster is then attached to the concave housing 28 to adjustably fix the preferred position of the concave housing 28. For example, a threaded shaft 42 may be extended through lens (not shown) or partially complete reflector 18 to couple with the concave housing 28. By threading the adjuster shaft 42, with respect to a holder held by the lens, or the partially complete concave housing 28, the concave housing 28 may be pivoted about the pivot axis to set the vertical alignment of the concave housing 28.

Upon the addition of the concave housing 28 to the base 12, the structure can be mounted in its proper location within the confines of the vehicle with which it is used and appropriate light sources, not shown, can be inserted via openings 52, 54 in reflector 16 and concave housing 28, respectively.

Thus there is provided a simple and inexpensive two-piece reflector having plural reflectors with at least one being adjustable. The pivots for the movable reflector portion are simply molded without pins or inserts, and the final assembly is snapped together. The result is an inexpensive, two piece pivot assembly providing a simple, and accurate assembly.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A two-piece reflector comprising:
   a base member with a front surface and a partially complete reflector projecting therefrom and integral therewith;
   first and second spaced apart supports associated with said partially complete reflector projecting from said base member and providing pivot points therein; and
   a substantially concave housing adjustably fitted to cooperate with said partially complete reflector, said concave housing having a pair of spaced apart, projecting, axially aligned nubbins, a first of said nubbins being rotationally fixed to said pivot point in said first support and a second of said nubbins being rotationally fixed to said pivot point in said second support.

2. The reflector of claim 1 wherein at least one pivot point has a first side defining a first surface of rotation about an axis, and a second side defining a second surface of rotation about the same axis, the second side being axially offset from the first side, the first side and second side defining an axial passage extending between the first side and the second side.

3. The reflector of claim 2 wherein said support includes a wall extending in a direction toward said substantially concave housing limiting free motion of a nubbin to thereby guide said nubbin to a respective pivot point.

4. The reflector of claim 1 wherein said substantially concave housing includes means for fixing said substantially concave housing in a desired position with said partially complete reflector.

5. A pivotable reflector lamp assembly comprising:
   a reflector having a first pivot shaft and a second pivot shaft defining an axis of rotation, and
   a housing element having a first support and a second support, each support having a pivot coupling to axially and rotationally mate with a respective pivot shaft, each support being sufficiently flexible to open a rotationally coupling to receive the first pivot shaft and a second pivot shaft, and sufficiently stiff to close the supports on the first pivot shaft and a second pivot shaft to capture them in the rotational coupling.

6. The lamp assembly in claim 5, wherein at least one of the supports includes a ramp extending from a distal end of one support toward one of the pivot couplings.

7. The lamp assembly in claim 5, wherein one of the supports includes a wall portion defining a hole in the support, the hole being sized and positioned to mate snuggly with an exterior surface of the at lease one of the pivot shafts.

8. The lamp assembly in claim 5, wherein at least one of the supports includes a face, transverse to the axis, shaped and positioned to mate with a face of the reflector.

9. A pivotable reflector lamp assembly comprising:
   a reflector having a first pivot shaft and a second pivot shaft defining an axis of rotation, and
   a housing element having a first support and a second support, each support having a pivot coupling to axially and rotationally mate with a respective pivot shaft, each support being sufficiently flexible to open a rotationally coupling to receive the first pivot shaft and a second pivot shaft, and sufficiently stiff to close the supports on the first pivot shaft and a second pivot shaft to capture them in the rotational coupling;
   wherein the at least one pivot coupling has a first side defining a first surface of rotation about an axis, and a second side defining, a second surface, of rotation about the same axis, the second side being axially offset from the first side, the first side and second side defining an axial passage extending between the first side and the second side.

* * * * *